US010326772B2

(12) United States Patent
Spertus et al.

(10) Patent No.: US 10,326,772 B2
(45) Date of Patent: Jun. 18, 2019

(54) SYSTEMS AND METHODS FOR ANONYMIZING LOG ENTRIES

(71) Applicant: Symantec Corporation, Mountain View, CA (US)

(72) Inventors: Michael Spertus, Chicago, IL (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 73 days.

(21) Appl. No.: 14/947,915

(22) Filed: Nov. 20, 2015

(65) Prior Publication Data
US 2017/0149793 A1 May 25, 2017

(51) Int. Cl.
G06F 17/00 (2019.01)
G06F 7/04 (2006.01)
H04L 29/06 (2006.01)
G06F 21/62 (2013.01)
H04L 12/24 (2006.01)

(52) U.S. Cl.
CPC ........ H04L 63/105 (2013.01); G06F 21/6245 (2013.01); G06F 21/6254 (2013.01); H04L 41/069 (2013.01); G06F 2221/2101 (2013.01)

(58) Field of Classification Search
CPC ............... H04L 63/105; H04L 41/069; G06F 21/6254; G06F 21/6245; G06F 2221/2101
USPC ....................................................... 726/1, 26
See application file for complete search history.

(56) References Cited

U.S. PATENT DOCUMENTS

| 8,001,136 B1* | 8/2011 | Papachristou .... G06F 17/30731 707/708 |
| 8,341,405 B2* | 12/2012 | Meijer ................ G06F 21/6218 713/165 |
| 2004/0163043 A1* | 8/2004 | Baudin ............. G06F 17/30616 715/234 |

(Continued)

FOREIGN PATENT DOCUMENTS

| GB | 2497397 A | 6/2013 |
| WO | WO 2009/136258 A1 | 11/2009 |
| WO | WO 2013/072930 A2 | 5/2013 |

OTHER PUBLICATIONS

Hunegnaw, Molla, "Confidentiality and Anonymization of Microdata", http://unstats.un.org/unsd/demographic/meetings/wshops/Ethiopia_20_Sept_2011/docs/Others/7.ppt, as accessed Sep. 23, 2015, United Nations Regional Seminar on Census Data Archiving for Africa, Addis Ababa, (Sep. 20-23, 2011).

(Continued)

Primary Examiner — Aravind K Moorthy
(74) Attorney, Agent, or Firm — FisherBroyles, LLP

(57) ABSTRACT

The disclosed computer-implemented method for anonymizing log entries may include (1) detecting a data pattern in a group of log entries documenting events performed by at least one process executing on at least one device, (2) identifying, in the data pattern, at least one data field in the log entries that contains variable data, (3) evaluating the data field containing variable data to determine whether the data field contains sensitive data, and (4) in response to determining whether the data field contains sensitive data, applying a data-anonymization policy to the data field to anonymize the log entries. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2004/0199828 | A1* | 10/2004 | Cabezas | G06F 11/0748 714/39 |
| 2006/0036637 | A1* | 2/2006 | Sayal | G06F 17/30592 |
| 2007/0299881 | A1* | 12/2007 | Bouganim | G06F 21/6227 |
| 2011/0239113 | A1* | 9/2011 | Hung | G16H 15/00 715/271 |
| 2011/0277037 | A1* | 11/2011 | Burke | G06F 21/6245 726/26 |
| 2013/0332194 | A1* | 12/2013 | D'Auria | G06F 19/322 705/3 |
| 2015/0082441 | A1* | 3/2015 | Gathala | G06F 9/541 726/25 |
| 2015/0302206 | A1 | 10/2015 | Averdunk et al. | |
| 2016/0055326 | A1* | 2/2016 | Votaw | G06F 21/316 726/19 |
| 2016/0062815 | A1* | 3/2016 | Ivanova | G06F 11/0751 714/26 |
| 2017/0126628 | A1* | 5/2017 | Krishna | H04L 63/0421 |
| 2018/0102938 | A1* | 4/2018 | Yoon | G06F 9/546 |
| 2018/0191729 | A1* | 7/2018 | Whittle | H04L 63/0227 |

OTHER PUBLICATIONS

Zhou, Bin et al., "A Brief Survey on Anonymization Techniques for Privacy Preserving Publishing of Social Network Data", https://www.cs.sfu.ca/~jpei/publications/SocialNetworkAnonymization_survey.pdf, as accessed Sep. 23, 2015, (Dec. 2008).

"Big Data: Principles and best practices of scalable realtime data systems", http://www.amazon.com/Big-Data-Principles-practices-scalable/dp/1617290343, as accessed Sep. 23, 2015, (May 10, 2015).

"DeepSight™ Intelligence", https://www.symantec.com/deepsight-products/, as accessed Sep. 23, 2015, Symantec Corporation, (On or before Sep. 23, 2015).

Qiu, Tongqing et al., "What Happened in my Network? Mining Network Events from Router Syslogs", http://www.researchgate.net/publication/221611870_What_happened_in_my_network_mining_network_events_from_router_syslogs. as accessed Sep. 23, 2015, IMC'10, Proceedings of the 10th ACM SIGCOMM Conference on Internet Measurement 2010, Melbourne, Australia, (Nov. 1-3, 2010).

* cited by examiner

SYSTEMS AND METHODS FOR ANONYMIZING LOG ENTRIES

BACKGROUND

System operation logs, such as security system logs, often contain valuable data about the operation of information systems. For example, system administrators may monitor security logs to verify that security systems are operating properly, diagnose operation or performance problems, identify system weaknesses, identify the source of security threats, and/or perform forensic analysis of security breaches. Administrators may also mine security log entries to discover new types of security threats. In addition, data analysts may mine system operation logs to analyze user behavior and/or system performance.

However, system operation logs frequently include sensitive information, such as personally identifying information (PII) or infrastructure-related information (such as network addresses or server names). Unfortunately, this information may enable an attacker to map an internal network and search for vulnerabilities. Log information may also expose work schedules, personal relationships, or other information that may be used in social engineering attacks. As such, if left unprotected, a security log may be the source of information used in a targeted threat. Accordingly, the instant disclosure identifies and addresses a need for additional and improved systems and methods for anonymizing log entries.

SUMMARY

As will be described in greater detail below, the instant disclosure describes various systems and methods for anonymizing log entries by identifying fields in log entries that may contain sensitive information and then applying a data-anonymization policy that anonymizes the sensitive information. The systems and methods described herein may apply various machine-learning techniques to identify sensitive information and to distinguish sensitive information from other variable data. The systems and methods described herein may also monitor data logs for new entries, determine whether the new entries contain sensitive information, and anonymize existing log file entries when new data fields containing sensitive information are identified.

In one example, a computer-implemented method for anonymizing log entries may include (1) detecting a data pattern in a group of log entries documenting events performed by one or more processes executing on one or more devices, (2) identifying, in the data pattern, one or more data fields in the log entries that contains variable data, (3) evaluating the data field containing variable data to determine whether the data field contains sensitive data, and (4) in response to determining whether the data field contains sensitive data, applying a data-anonymization policy to the data field to anonymize the log entries.

In some examples, detecting the data pattern in the log entries may include performing a message-template-learning analysis of the log entries. In some examples, detecting the data pattern in the log entries may include performing a longest-common-subsequence analysis of the log entries. In one embodiment, the computer-implemented method may further include (1) receiving a log entry from an additional process executing on an additional device or devices, (2) matching the log entry to a data pattern in a set of data patterns previously identified in the log entries, (3) identifying a data-anonymization policy corresponding to the data pattern, and (4) anonymizing the log entry by applying the corresponding data-anonymization policy.

In one embodiment, the computer-implemented method may further include (1) determining a threshold number of privacy contexts in which the data pattern must be found for the data pattern to be considered anonymized, (2) detecting the data pattern in a group of privacy contexts, (3) determining that the number of privacy contexts containing the data pattern exceeds the privacy context threshold, and (4) determining, in response to determining that the number of privacy contexts containing the data pattern exceeds the privacy context threshold, that the data pattern is anonymized. In one embodiment, the data-field evaluation determines that the data field contains sensitive data and the data-anonymization policy anonymizes the data field by (1) encrypting the data field using a one-way hash, (2) encrypting the data field using reversible encryption, (3) replacing the data field with random data, (4) replacing the data field with static data, (5) removing the data field, and/or (6) generalizing the data field.

In one embodiment, the data-field evaluation determines that the data field contains enumerated data and therefore does not contain sensitive data and the data-anonymization policy does not modify the data field. In another embodiment, the data-field evaluation determines that the data field contains data of a data type known to not include sensitive data and the data-anonymization policy does not modify the data field. In addition, the data-field evaluation may determine that the data field now contains sensitive data, even though the data field was previously determined to not contain sensitive data. The data-anonymization policy may then anonymize the data field in a group of existing log entries.

In one embodiment, a system for implementing the above-described method may include several modules stored in memory, such as (1) a pattern module that detects a data pattern in a group of log entries documenting events performed by one or more processes executing on one or more devices, (2) a field-analysis module that identifies, in the data pattern, one or more data fields in the log entries that contains variable data, (3) a data-analysis module that evaluates the data field containing variable data to determine whether the data field contains sensitive data, and (4) an anonymization module that, in response to determining whether the data field contains sensitive data, applies a data-anonymization policy to the data field to anonymize the log entries. The system may also include at least one physical processor configured to execute the pattern module, the field-analysis module, the data-analysis module, and the anonymization module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a data pattern in a group of log entries documenting events performed by one or more processes executing on one or more devices, (2) identify, in the data pattern, one or more data fields in the log entries that contains variable data, (3) evaluate the data field containing variable data to determine whether the data field contains sensitive data, and (4) in response to determining whether the data field contains sensitive data, apply a data-anonymization policy to the data field to anonymize the log entries.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
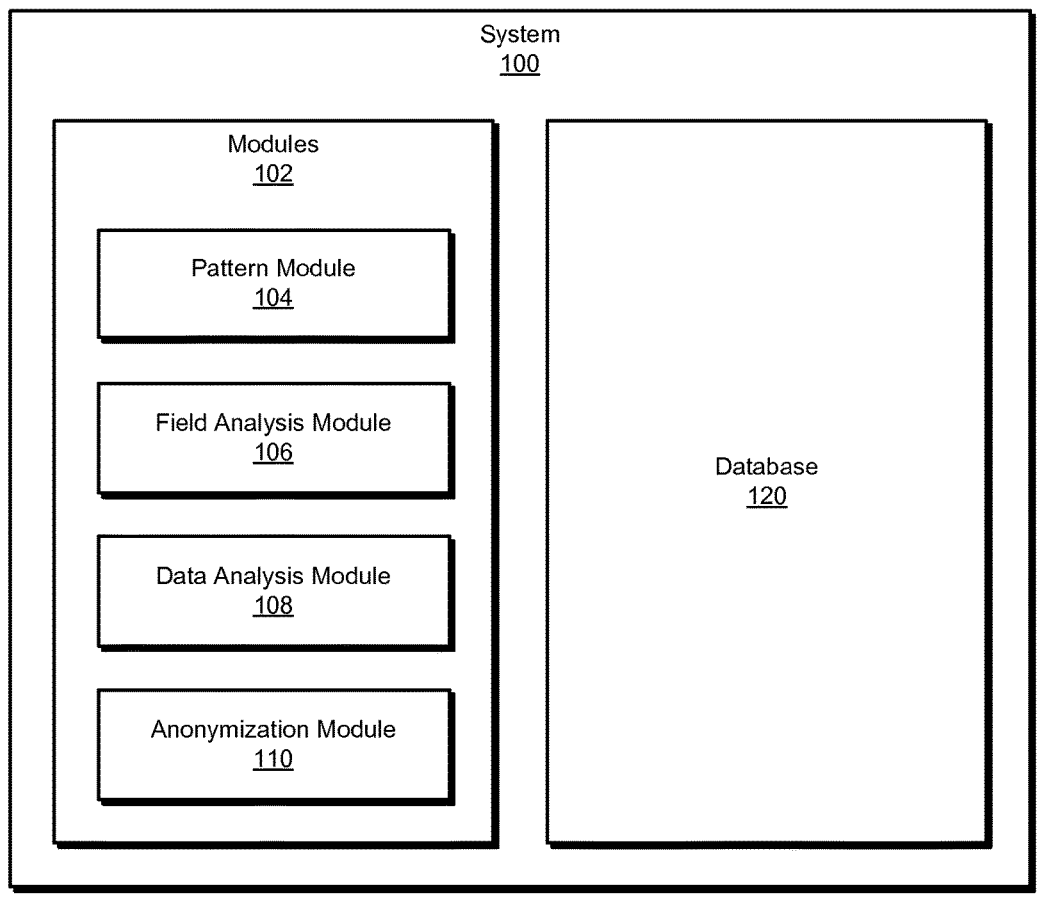
FIG. 1 is a block diagram of an exemplary system for anonymizing log entries.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for anonymizing log entries. As will be explained in greater detail below, by applying machine-learning techniques, the systems and methods described herein may identify data fields containing personally identifying information or other sensitive data and anonymize the data fields by applying a selected data-anonymization policy. Data-anonymization policies may be customized in a variety of ways, including according to data type, the desired level of security, plans for future data mining of log files, etc. The systems and methods described herein may also apply data-anonymization procedures to exceed a data-field-anonymization metric. In addition, the systems and methods described herein may continuously monitor new log entries for sensitive data in new or existing data fields, and reapply data-anonymization policies to an existing collection of security logs as new sensitive information is identified.

Figure 2:
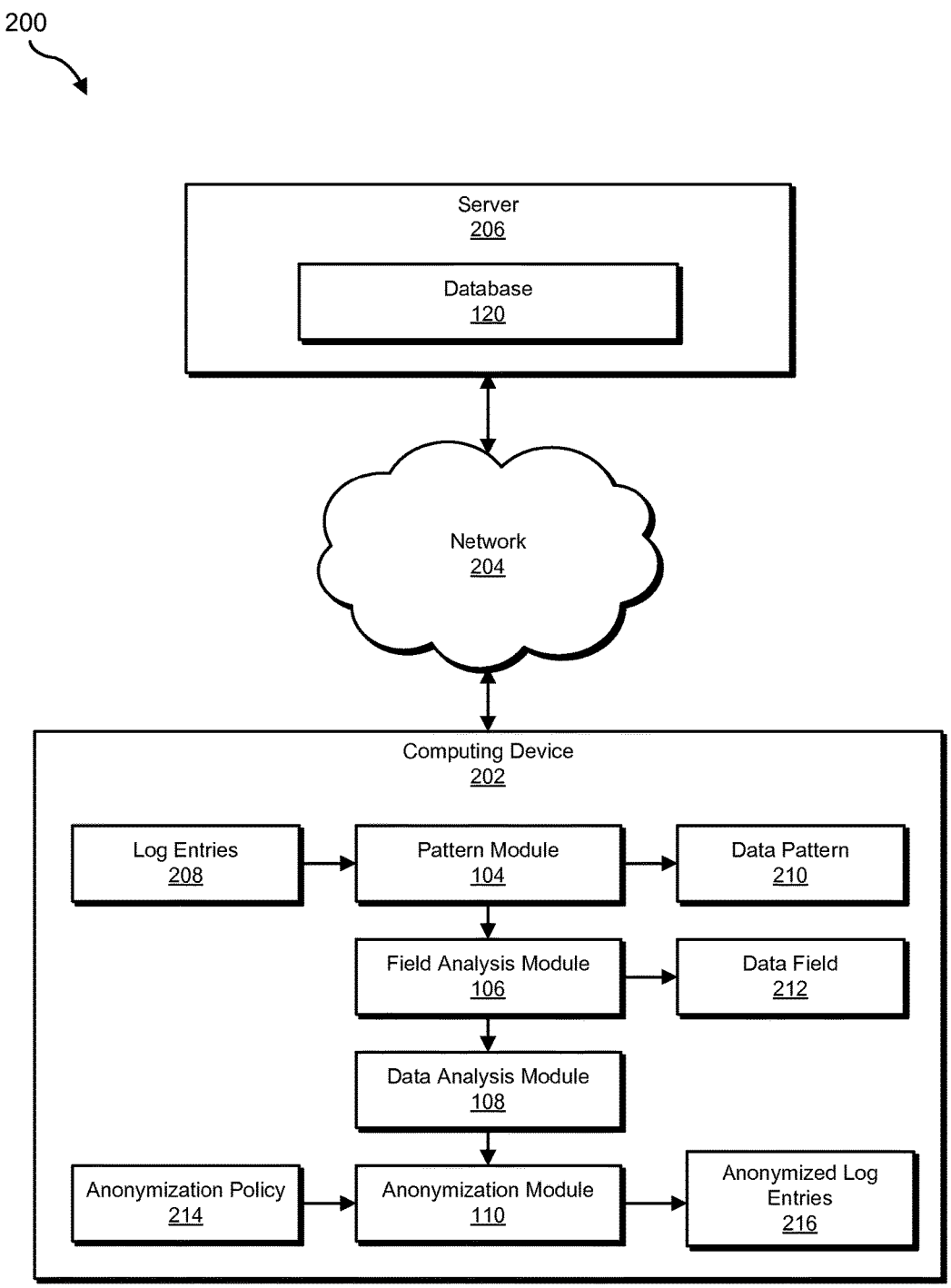
FIG. 2 is a block diagram of an additional exemplary system for anonymizing log entries.
Figure 3:
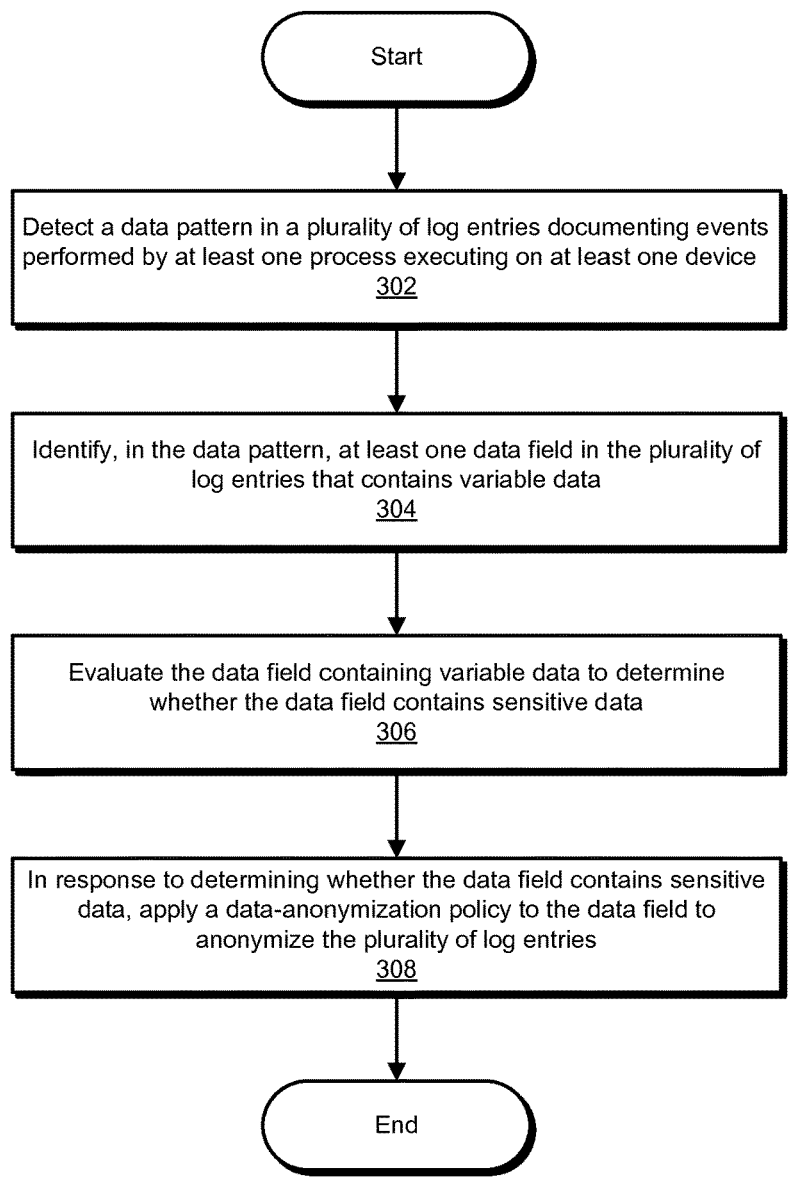
FIG. 3 is a flow diagram of an exemplary method for anonymizing log entries.
Figure 4:
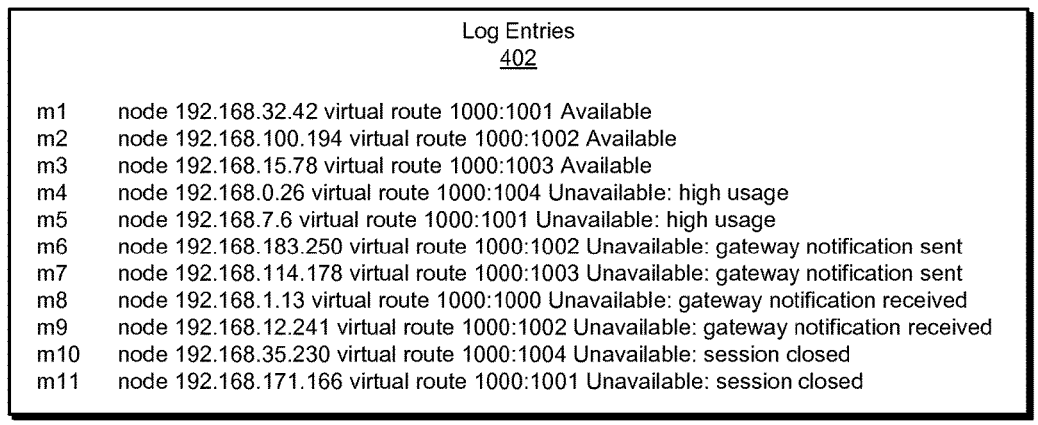
FIG. 4 is a block diagram of exemplary log data.
Figure 4:
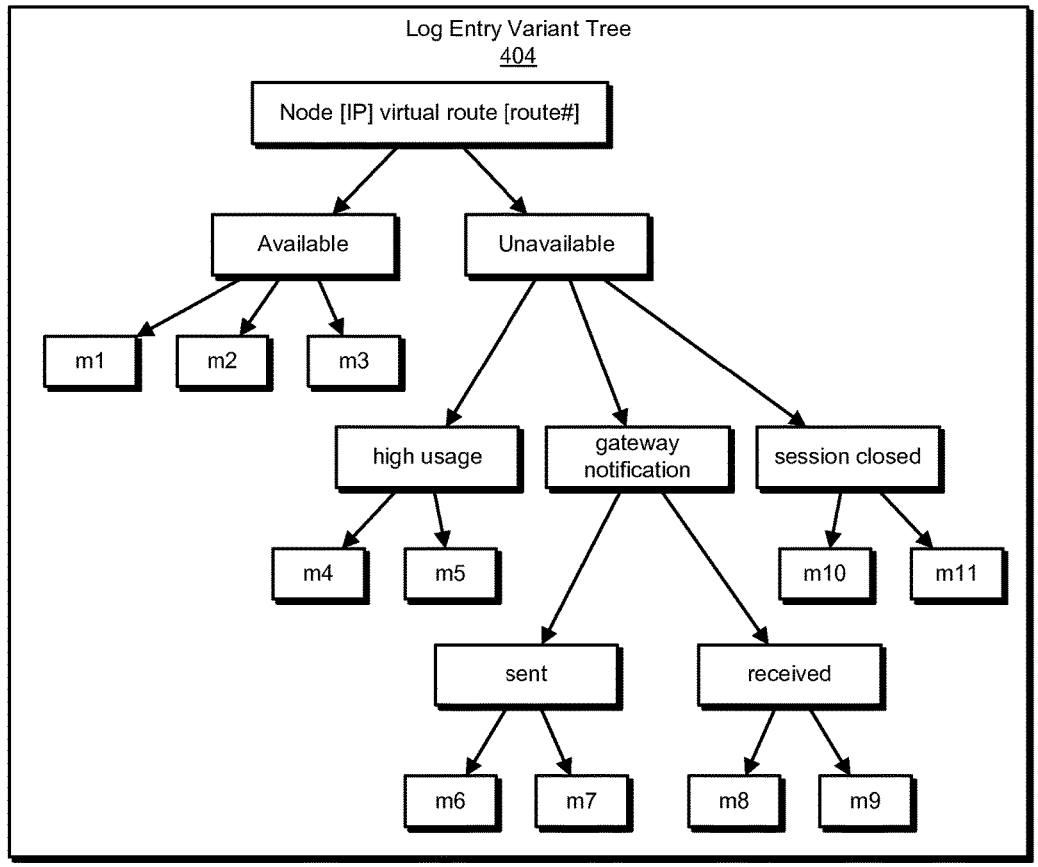

The following will provide, with reference to FIGS. 1, 2, and 4, detailed descriptions of exemplary systems for anonymizing log entries. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for anonymizing log entries. As illustrated in this figure, exemplary system 100 may include one or more modules 102 for performing one or more tasks. For example, and as will be explained in greater detail below, exemplary system 100 may include a pattern module 104 that detects a data pattern in a plurality of log entries documenting events performed by one or more processes executing on one or more devices. Exemplary system 100 may additionally include a field analysis module 106 that identifies, in the data pattern, one or more data fields in the plurality of log entries that contains variable data. Exemplary system 100 may also include a data analysis module 108 that evaluates the data field containing variable data to determine whether the data field contains sensitive data. Exemplary system 100 may additionally include an anonymization module 110 that, in response to determining whether the data field contains sensitive data, applies a data-anonymization policy to the data field to anonymize the plurality of log entries. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more system operating logs, data-anonymization policy information, system-log-entry pattern data, and/or data to assist in identifying sensitive data, such as personally identifying information.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to anonymize log entries. For example, and as will be described in greater detail below, one or more of modules 102 may cause computing device 202 and/or server 206 to anonymize log entries. For example, and as will be described in greater detail below, pattern module 104 may detect a data pattern 210 in a plurality of log entries 208 documenting events performed by one or more processes executing on one or more devices. Field analysis module 106 may then identify, in data pattern 210, one or more data fields 212 in the plurality of log entries 208 that contains variable data. Data analysis module 108 may then evaluate data field 212 containing variable data to determine whether data field 212 contains sensitive data. Finally, anonymization module 110 may, in response to determining whether data field 212 contains sensitive data, apply a data-anonymization policy 214 to data field 212 to anonymize the plurality of log entries 208 to create anonymized log entries 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of receiving, storing, and/or comparing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for anonymizing log entries. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may detect a data pattern in a plurality of log entries documenting events performed by one or more processes executing on one or more devices. For example, pattern module 104 may, as part of computing device 202 in FIG. 2, detect a data pattern 210 in a plurality of log entries 208 documenting events performed by one or more processes executing on one or more devices. The log files containing log entries 208 may reside on computing device 202, server 206, and/or one or more other computing devices. In addition, the log entries may have been created by one or more processes executing on any of those devices.

Pattern module 104 may detect a data pattern in the log entries in a variety of ways. For example, for some processes, particularly for widely-used programs, pattern module 104 may obtain the data pattern for the log entries from program documentation or other publicly available sources. In other examples, pattern module 104 may use text analysis programs on existing log entries to identify fixed and variable portions of log entries. This approach may be sufficient to identify data patterns for programs with few variable data fields or a small number of log entry formats.

For log files with a structure that is not easily discernible, such as log files with a large number of log entry formats or many variable data fields containing a mixture of enumerated data and personally identifiable information, pattern module 104 may apply any of a variety of machine-learning algorithms to detect data patterns in the log entries. In some examples, pattern module 104 may detect the data pattern in the plurality of log entries by performing a message-template-learning analysis of the plurality of log entries. The term "message-template-learning analysis," as used herein, generally refers to a method for decomposing texts with common combinations of words into message variants.

FIG. 4 is a block diagram of exemplary log entry data 400 that pattern module 104 may use in a message-template-learning analysis to detect log entry formats. Log entry data 400 may include a set of log entries 402 that have been identified to have many words in common, as compared to other log entries. In this example, log entry variant tree 404 represents a data structure constructed to represent the hierarchy of log entry formats included in the group. As such, a message associates with a word when the word appears in the message. For example, messages m1, m2, and m3 contain the word "Available," so those messages associate with the node representing the word "Available" in log entry variant tree 404. Given each parent node, pattern module 104 may look for the most frequent combination of words that associate with and make that combination a child node. Pattern module 104 may repeat this process until all messages are associated. Pattern module 104 may then prune branches of the tree that contain many variants. For example, messages in log entries 402 may include many IP addresses and virtual route numbers. Pattern module 104 may identify these groups of variants as data fields containing variable data.

In some examples, pattern module 104 may detect the data pattern in the plurality of log entries by performing a longest-common-subsequence analysis of the plurality of log entries. The term "longest-common-subsequence analysis," as used herein, generally refers to an algorithm, used as the basis for several textual analysis utility programs, for finding the longest common sequence of words in a set of messages. Longest-common-subsequence analysis differs from message-template-learning analysis in that it accounts for the order words appear in a message, where message-template-learning is only concerned with whether the words appear, regardless of order.

At step 304, one or more of the systems described herein may identify, in the data pattern, one or more data fields in the plurality of log entries that contain variable data. For example, field analysis module 106 may, as part of computing device 202 in FIG. 2, identify, in data pattern 210, one or more data fields 212 in the plurality of log entries 208 that contain variable data.

Field analysis module 106 may identify data fields that contain variable data in a variety of ways. For example, field analysis module 106 may identify data fields containing variable data as part of the analysis performed by pattern module 104 in step 302 to identify data patterns in the set of log entries. For some programs, field analysis module 106 may identify data fields that contain variable data from program documentation. In other examples, field analysis module 106 may use text analysis programs (such as the diff utility on UNIX or LINUX systems) on existing log entries to identify data fields that contain variable data.

In some examples, field analysis module 106 may, as previously mentioned, identify data fields containing variable data using machine-learning algorithms such as message-template-learning analysis and longest-common-sequence analysis. For example, as shown in FIG. 4, message-template-learning analysis may determine that the IP addresses and route numbers in messages m1-m11 introduce many text variant nodes to log entry variant tree 404, and therefore represent data fields containing variable data.

At step 306, one or more of the systems described herein may evaluate the data field containing variable data to determine whether the data field contains sensitive data. For example, data analysis module 108 may, as part of computing device 202 in FIG. 2, evaluate data field 212 containing variable data to determine whether data field 212 contains sensitive data.

The phrase "sensitive data," as used herein, generally refers to proprietary data for which public disclosure may result in harm to individuals or an organization. Sensitive data may include personally identifying information (PII), infrastructure-related data, such as internal IP addresses, user names, or server names, or data protected by law, contract, or organizational policy against disclosure.

Data analysis module 108 may determine that a data field containing variable data contains sensitive data in a variety of ways. For example, program documentation or other publically available information may indicate that a particular data field in a log entry may contain sensitive data. In another example, data analysis module 108 may search a database or network directory service to determine if a data field contains personally identifying information, user names, server names, etc. In another example, data analysis module 108 may use network diagnostics to determine if a data field contains network infrastructure information, such as IP addresses internal to the organization. Data analysis module 108 may determine that internal IP addresses constitute sensitive information, while external IP addresses do not.

At step 308, one or more of the systems described herein may apply, in response to determining whether the data field contains sensitive data, a data-anonymization policy to the data field to anonymize the plurality of log entries. For example, anonymization module 110 may, as part of computing device 202 in FIG. 2, in response to determining whether data field 212 contains sensitive data, apply data-anonymization policy 214 to data field 212 to anonymize the plurality of log entries 208 to produce anonymized log entries 216.

Anonymization module 110 may apply a data-anonymization policy to the data field in a variety of ways. For example, anonymization module 110 may apply the same data-anonymization policy to all sensitive data or apply different data-anonymization policies, depending on the data type. In one embodiment, the data-field evaluation may determine that the data field contains sensitive data. In this embodiment, the data-anonymization policy may anonymize the data field using one or more data-anonymization techniques. The choice of data anonymization techniques may vary, for example, depending on a level of security required for the data field, whether some information in the data field is to be preserved for later analysis of the log entries, or any other criteria.

In one example, anonymization module 110 may anonymize the data field by encrypting the data field using a one-way hash. Using a one-way hash may facilitate later analysis of log entries while protecting sensitive data from disclosure. Since a hash algorithm generates the same data for the same hash value each time the algorithm is applied, hashing the data may preserve the information that the same hash value refers to the same source text in each case, without disclosing the source text. For example, the MD5 hash algorithm generates the hash value "d0d4742e5beb935cf3272c4e77215f18" for the user name KPAULSEN. Someone analyzing log entries at a later time may recognize that the hash value refers to the same user in every case, without knowing the user name.

In another example, anonymization module 110 may anonymize the data field by encrypting the data field using reversible encryption. As with hashing, using a reversible encryption algorithm to anonymize a data field may preserve the correspondence between the encrypted value and the source text, without disclosing the source text. However, with reversible encryption, a trusted data analyst may use a private encryption key to decrypt the encrypted text to recreate the source text.

In another example, anonymization module 110 may anonymize the data field by replacing the data field with random data. In this way, anonymization module 110 may protect sensitive data in the data field without maintaining the relationship between the anonymized data and the source data, as with hashing. Using random data to anonymize a data field still preserves the information that the data field contains variable data. As discussed above, machine-learning algorithms like message-template-learning may identify variable data fields in the process of analyzing log entries.

In another example, anonymization module 110 may anonymize the data field by generalizing the data field. Data generalization is an anonymization technique that replaces specific sensitive data with more general data that identifies a category of the specific data without disclosing the data itself. For example, anonymization module 110 may anonymize the internal IP address "208.65.13.15" as "208.65.13.XXX." Someone analyzing the anonymized data log would be able to identify the subnetwork of the computing device, but not the specific device. In another example, anonymization module 110 may replace a user name with the name of the department in which they work.

Some simple anonymization techniques effectively anonymize sensitive data, but preserve little or no information for later analysis. In one example, anonymization module 110 may anonymize the data field by replacing the data field with static data. For example, anonymization module 110 may replace an IP address with the string "[IP Address]." In another example, anonymization module 110 may anonymize the data field simply by removing the data field.

In one embodiment, the systems described herein may use a statistical heuristic to determine whether data-anonymization policies have achieved a desired level of anonymization. For example, the systems described herein may (1) determine a threshold number of privacy contexts in which the data pattern must be found for the data pattern to be considered anonymized, (2) detect the data pattern in a plurality of privacy contexts, (3) determine that the number of privacy contexts containing the data pattern exceeds the privacy context threshold, and (4) determine, in response to determining that the number of privacy contexts containing the data pattern exceeds the privacy context threshold, that the data pattern is anonymized. As used herein, the term "privacy context" generally refers to an environment containing private information that must be anonymized. For example, the log files from one business may be a privacy context. If a data pattern is found in a sufficient number of privacy contexts, the data pattern may be considered free of personally identifiable information and therefore sufficiently anonymized. For example, anonymization module 110 may, as part of computing device 202 in FIG. 2, determine that if a data pattern is found in 50% of privacy contexts, the data pattern is sufficiently anonymized.

In one embodiment, the data-field evaluation may determine that the data field contains enumerated data and therefore does not contain sensitive data. In this embodiment, the data-anonymization policy may not modify the data field. For example, data analysis module 108 may, as part of computing device 202 in FIG. 2, determine that while the data field contains variable data, the number of variants is relatively small, indicating that the field contains enumerated data with just a few possible values. For example, data analysis module 108 may determine that a data field includes only the values "Installed," "Refreshed," and "Uninstalled," and no further action is required to anonymize the data field.

In another embodiment, the data-field evaluation may determine that the data field contains data of a data type known to not include sensitive data. In this embodiment, the data-anonymization policy may not modify the data field. For example, program documentation or other publicly available sources may indicate that a data field contains data of a particular data type not considered to be sensitive data, and that a data-anonymization policy for the data field does not need to take any further action to anonymize the data field.

In one embodiment, the systems described herein may monitor log files for new entries being added and apply data-anonymization policies as needed to anonymize the log entries. For example, the systems described herein may (1) receive a log entry from an additional process executing on an additional device, (2) match the log entry to a data pattern in a set of data patterns previously identified in the plurality of log entries, (3) identify a data-anonymization policy corresponding to the data pattern, and (4) anonymize the log entry by applying the corresponding data-anonymization policy. For example, pattern module 104 may, as part of computing device 202 in FIG. 2, receive a log entry from a device and determine that the data pattern of the log entry matches a previously identified data pattern. Anonymization module 110 may then apply the data-anonymization policy corresponding to the identified data pattern to anonymize the log entry.

In one embodiment, the data-field evaluation may determine that the data field now contains sensitive data, even though the data field was previously determined to not contain sensitive data. In this example, the data-anonymization policy may anonymize the data field in a plurality of existing log entries. For example, while monitoring log files for new entries, the systems described herein may identify sensitive data in fields previously determined to contain enumerated data or other non-sensitive data. Specifically, anonymization module 110 may, as part of computing device 202 in FIG. 2, anonymize the data field in the new log entry and existing log entries to achieve the desired level of data anonymization.

As described in greater detail above, the systems and methods described herein may anonymize log entries by first identifying data fields containing sensitive information and then applying data-anonymization policies to anonymize the sensitive data. The systems and methods described herein may apply machine-learning algorithms or other techniques for identifying data fields in log entries that contain variable data. The systems and methods described herein may also apply a variety of techniques to identify sensitive data within the data fields. Additionally, the systems and methods described herein may select a data-anonymization policy to provide for various levels of data security or to facilitate later analysis of log entries. The systems and methods described herein may also evaluate the data-anonymization procedures to verify that the procedures meet or exceed a desired measure of data anonymization. Additionally, systems and methods described herein may continue to monitor log files to anonymize new log entries or determine when existing log entries should be reprocessed to maintain the desired level of data anonymization.

Figure 5:
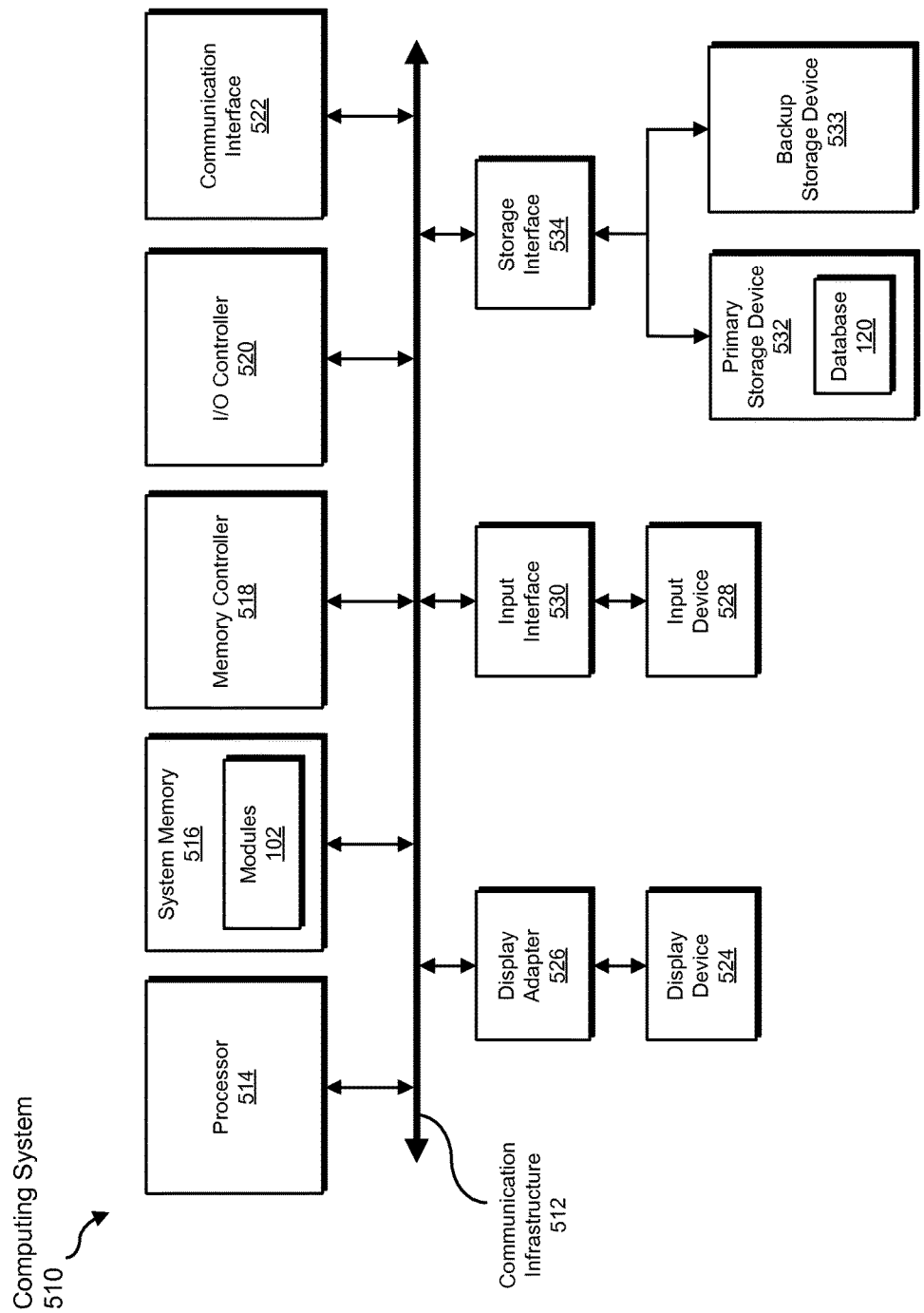
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
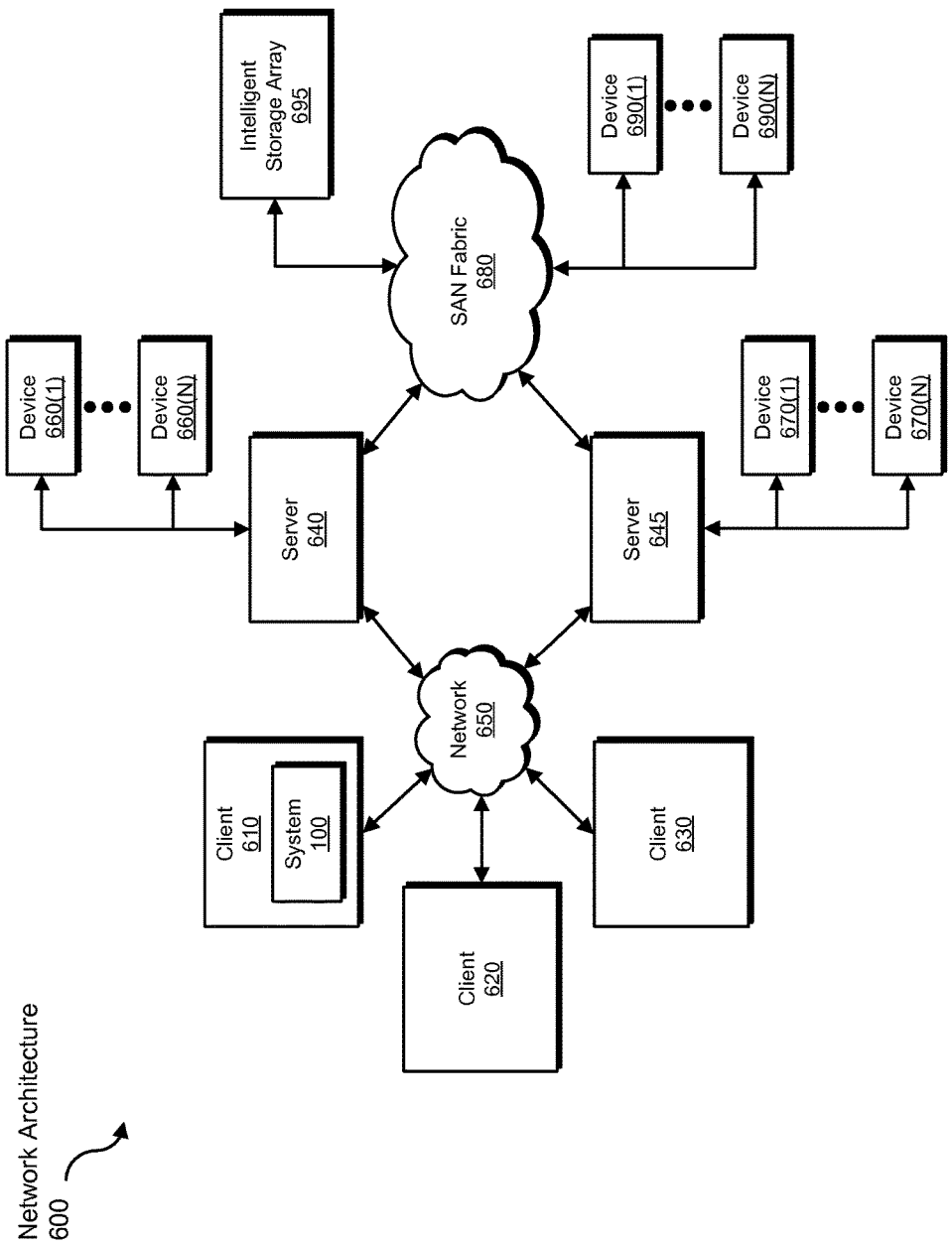
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for anonymizing log entries.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive operating log entries to be transformed, transform the log entries, output a result of the transformation to anonymize the log entries, use the result of the transformation to anonymize one or more data logs, and store the result of the transformation to protect personally identifiable information. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for anonymizing security log entries, wherein each step of the method is performed by a computing device comprising at least one processor, the method comprising:
   using a machine-learning algorithm to detect a fixed and variable data field, containing variable data, included in each of one or more security log entries;
   in response to determining that the data field is fixed and contains variable data, evaluating the data field to determine whether the data field contains sensitive data;
   applying, in response to determining whether the data field contains sensitive data, a data-anonymization policy to the data field to anonymize the security log entries, wherein:
      the data-anonymization policy comprises a policy to replace data fields that contain sensitive data with static data that identifies a type of the data fields;
      applying the data-anonymization policy comprises replacing the data field in at least one of the security log entries with static data that identifies a type of the data field.

2. The computer-implemented method of claim 1, wherein using the machine-learning algorithm to detect the fixed and variable data field comprises performing a message-template-learning analysis of a plurality of security log entries comprising the one or more security log entries.

3. The computer-implemented method of claim 1, wherein using the machine-learning algorithm to detect the fixed and variable data field comprises performing a longest-common-subsequence analysis of a plurality of security log entries comprising the one or more security log entries.

4. The computer-implemented method of claim 1, further comprising:
   receiving a log entry from an additional process executing on an additional device;
   determining that the log entry includes the data field;
   anonymizing the log entry by applying the data-anonymization policy to the data field included in the log entry.

5. The computer-implemented method of claim 1, further comprising:
   determining a threshold number of privacy contexts in which the data field must be found for the data field to be considered anonymized;
   detecting the data field in a plurality of privacy contexts;
   determining that the number of privacy contexts containing the data field exceeds the privacy context threshold;
   determining, in response to determining that the number of privacy contexts containing the data field exceeds the privacy context threshold, that the data field is anonymized.

6. The computer-implemented method of claim 1, wherein determining whether the data field contains sensitive data comprises determining whether the data field contains sensitive data based on publically available information.

7. The computer-implemented method of claim 1, wherein determining whether the data field contains sensitive data comprises determining whether the data field contains sensitive data based on whether the data field comprises at least one of personally identifying information, user names, and server names.

8. The computer-implemented method of claim 1, wherein replacing the data field with static data that identifies the type of the data field comprises replacing a certain IP address with a string that indicates that the data field includes an IP address without including the certain IP address.

9. The computer-implemented method of claim 1, wherein:
   the data-field evaluation determines that the data field now contains sensitive data, even though the data field was previously determined to not contain sensitive data;
   the data-anonymization policy anonymizes the data field in a plurality of existing security log entries.

10. A system for anonymizing security log entries, the system comprising:
    a field analysis module, stored in memory, that uses a machine-learning algorithm to detect a fixed and variable data field, containing variable data, included in each of one or more security log entries a data analysis module, stored in memory, that, in response to the field analysis module determining that the data field is fixed and contains variable data, evaluates the data field to determine whether the data field contains sensitive data;
    an anonymization module, stored in memory, that applies, in response to determining whether the data field contains sensitive data, a data-anonymization policy to the data field to anonymize the security log entries, wherein:
       the data-anonymization policy comprises a policy to replace data fields that contain sensitive data with static data that identifies a type of the data fields;
       the anonymization module applies the data-anonymization policy by replacing the data field in at least one of the security log entries with static data that identifies a type of the data field;
    at least one physical processor configured to execute the field analysis module, the data analysis module, and the anonymization module.

11. The system of claim 10, wherein the machine-learning algorithm detects the fixed and variable data field by performing a message-template-learning analysis of a plurality of security log entries comprising the one or more security log entries.

12. The system of claim 10, wherein the machine-learning algorithm detects the fixed and variable data field by performing a longest-common-subsequence analysis of a plurality of security log entries comprising the one or more security log entries.

13. The system of claim 10, wherein the anonymization module further:
    receives a log entry from an additional process executing on an additional device;
    determines that the log entry includes the data field;
    anonymizes the log entry by applying the data-anonymization policy to the data field included in the log entry.

14. The system of claim 10, wherein the anonymization module further:
    determines a threshold number of privacy contexts in which the data field must be found for the data field to be considered anonymized;

detects the data field in a plurality of privacy contexts;
determines that the number of privacy contexts containing the data field exceeds the privacy context threshold;
determines, in response to determining that the number of privacy contexts containing the data field exceeds the privacy context threshold, that the data field is anonymized.

15. The system of claim 10, wherein:
the data-field evaluation determines that the data field contains sensitive data;
the data-anonymization policy anonymizes the data field by at least one of:
encrypting the data field using a one-way hash;
encrypting the data field using reversible encryption;
replacing the data field with random data;
replacing the data field with static data;
removing the data field;
generalizing the data field.

16. The system of claim 10, wherein the anonymization module replaces the data field with static data that identifies the type of the data field by replacing a certain IP address with a string that indicates that the data field includes an IP address without including the certain IP address.

17. The system of claim 10, wherein data analysis module determines whether the data field contains sensitive data by at least one of:
determining whether the data field contains sensitive data based on publically available information;
determining whether the data field contains sensitive data based on whether the data field comprises at least one of personally identifying information, user names, and server names.

18. The system of claim 10, wherein:
the data-field evaluation determines that the data field now contains sensitive data, even though the data field was previously determined to not contain sensitive data;
the data-anonymization policy anonymizes the data field in a plurality of existing security log entries.

19. A non-transitory computer-readable medium comprising one or more computer-readable instructions that, when executed by at least one processor of a computing device, cause the computing device to:
use a machine-learning algorithm to detect a fixed and variable data field, containing variable data, included in each of one or more security log entries;
in response to determining that the data field is fixed and contains variable data, evaluate the data field containing variable data to determine whether the data field contains sensitive data;
apply, in response to determining whether the data field contains sensitive data, a data-anonymization policy to the data field to anonymize the plurality of security log entries, wherein:
the data-anonymization policy comprises a policy to replace data fields that contain sensitive data with static data that identifies a type of the data fields;
the one or more computer-readable instructions cause the computing device to apply the data-anonymization policy by causing the computing device to replace the data field in at least one of the security log entries with static data that identifies a type of the data field.

20. The non-transitory computer-readable medium of claim 19, wherein the one or more computer-readable instructions cause the computing device to replace the data field with static data that identifies the type of the data field by causing the computing device to replace a certain IP address with a string that indicates that the data field includes an IP address without including the certain IP address.

* * * * *